United States Patent [19]

Mallory

[11] Patent Number: 5,708,368
[45] Date of Patent: Jan. 13, 1998

[54] METHOD AND APPARATUS FOR EMULATION OF A LINEAR VARIABLE DIFFERENTIAL TRANSDUCER BY A CAPACITIVE GAGING SYSTEM

[75] Inventor: Roy E. Mallory, Bedford, Mass.

[73] Assignee: ADE Corporation, Newton, Mass.

[21] Appl. No.: 612,450

[22] Filed: Mar. 7, 1996

[51] Int. Cl.⁶ .......................... G01R 31/02; G01R 27/26
[52] U.S. Cl. .................. 324/663; 364/571.01; 324/683
[58] Field of Search ............................. 324/661, 663, 324/683, 128; 364/571.01, 571.02

[56] References Cited

U.S. PATENT DOCUMENTS

| | | | |
|---|---|---|---|
| 4,158,171 | 6/1979 | Abbe et al. | 324/661 |
| 4,253,079 | 2/1981 | Brosh | 336/84 C |
| 4,654,598 | 3/1987 | Arulanandan | 324/683 |
| 4,873,655 | 10/1989 | Kondvaske | 364/571.02 |
| 4,899,102 | 2/1990 | Hendrick et al. | 324/663 |
| 4,918,376 | 4/1990 | Poduje et al. | 324/663 |
| 4,949,289 | 8/1990 | Stephens et al. | 364/571.01 |
| 5,025,223 | 6/1991 | Smith, Jr. et al. | 324/662 |
| 5,136,262 | 8/1992 | Spencer | 331/135 |
| 5,189,377 | 2/1993 | Rhoades et al. | 324/662 |
| 5,210,490 | 5/1993 | Munch et al. | 324/207.17 |
| 5,309,110 | 5/1994 | O'Neill et al. | 324/663 |
| 5,317,919 | 6/1994 | Awtrey | 73/718 |
| 5,351,410 | 10/1994 | Hainneville | 33/542 |
| 5,418,468 | 5/1995 | Baker et al. | 324/674 |
| 5,442,297 | 8/1995 | Verkuil | 324/702 |
| 5,559,431 | 9/1996 | Sellen | 364/571.01 |

Primary Examiner—Maura K. Regan
Attorney, Agent, or Firm—Weingarten, Schurgin, Gagnebin & Hayes LLP

[57] ABSTRACT

A capacitive gaging system comprising a capacitive displacement sensor and an interface circuit is used to replace a Linear Variable Differential Transducer (LVDT). An output of the capacitive displacement sensor is modified by the interface circuit which provides an output signal or signals representative of different types of LVDT outputs. The capacitive displacement sensor and the interface circuit can then be used to replace the LVDT in an LVDT measurement system. Accordingly, the capacitive displacement sensor and the interface circuit replace the LVDT without replacing the rest of the measurement system.

23 Claims, 4 Drawing Sheets

METHOD AND APPARATUS FOR EMULATION OF A LINEAR VARIABLE DIFFERENTIAL TRANSDUCER BY A CAPACITIVE GAGING SYSTEM

FIELD OF THE INVENTION

The invention relates generally to measurement instrumentation, and more particularly to displacement measurement systems.

BACKGROUND OF THE INVENTION

Linear Variable Voltage Transducers (LVDTs) are known in the art. LVDTs are commonly used for displacement measurements. A typical LVDT measurement system comprises an LVDT coupled to a conditioning circuit. The conditioning circuit drives the LVDT and receives the LVDT output signal or signals. The conditioning circuit transforms the LVDT signal or signals to voltages or to a digital representation. The conditioning circuit has its output coupled to an LVDT back-end, which can be a logic controller with feedback, a process control or monitoring system, a part selection and classification system, a quality selection system, or a system which provides an output in human readable form.

In certain measurement applications the implementation of an LVDT measurement system suffers from several drawbacks. LVDT displacement sensors must physically contact the surface they are measuring. In applications requiring measurements of surfaces that are rotating or moving fast the physical application of a measurement arm of the LVDT displacement sensor upon the device can cause damage to the rotating or fast moving device. In applications where the object being measured is sensitive, such as a semiconductor wafer surface or glass, it is desirable to measure the surface without making physical contact with the surface as such contact can cause damage to the object being measured.

LVDT devices are also more likely to require maintenance since they can wear out, due to their physically contacting the surface of the device they are measuring. As the contacting surface of the measurement arm of the LVDT wears down the accuracy of the measurements may be affected. The speed of making the measurements may also be affected, since there is physical contact involved, there is a maximum speed the LVDT can make accurate measurements at before the speed of the device causes the LVDT contact to bounce or vibrate, thereby affecting the precision of the surface measurements.

SUMMARY OF THE INVENTION

A method and apparatus for utilizing a capacitive displacement sensor in place of an LVDT sensor is disclosed. Capacitive displacement sensors provide displacement measurements without physically contacting the surface of the device being measured. The capacitive displacement sensor typically comprises a capacitive probe which includes two plates of a three plate capacitor. A third plate of the three plate capacitor is the surface of the object being measured. The capacitive probe is brought into proximity, but does not come into contact with, the surface being measured, thereby forming the three plate capacitor. The air between the capacitive probe and the surface being measured is the dielectric of the three plate capacitor. In one implementation, the sensor further includes an operational-amplifier configured as an inverting amplifier with its output grounded, thus the circuits output is the operational-amplifiers noninverting input. An excitation voltage is coupled to the three plate capacitor through a reference capacitor. The resulting signal can be expressed mathematically by the formula:

$$V_0 = V_i \frac{C_r d}{\epsilon_0 A}$$

where: $V_0$=output voltage of the sensor, $V_i$=the excitation voltage, $C_r$=value of the reference capacitor, d=probe-to-surface spacing, $\epsilon_0$=permittivity of air, and A=area of the probe. As the probe-to-surface distance d changes, there is a concomitant linear change in the output voltage $V_0$.

Capacitive displacement sensors are better suited for measuring surfaces of rotating or fast moving devices as compared to LVDT sensors since the capacitive displacement sensors are not in physical contact with the device being measured. The capacitive displacement sensor is also better suited for measuring sensitive surfaces such as glass or semiconductor wafers for the same reason. Additionally, there are lower maintenance costs associated with the capacitive displacement sensor since there are no moving parts to wear out or breakdown. The accuracy of the capacitive sensor is also higher since there are no contact surfaces to wear down during use.

In certain measurement applications a capacitive displacement sensor is a more preferable measurement tool to use than an LVDT device. However, replacement of an LVDT measuring system with a capacitive displacement measurement system can be very costly. It is therefore desirable to replace the LVDT with a capacitive displacement sensor and to interface the capacitive displacement sensor to the LVDT conditioning circuit in order to utilize the existing LVDT conditioning circuit and LVDT back-end.

The method and apparatus of the invention further include an interface circuit which converts the output of the capacitive displacement sensor into one approximating that which would have been provided by the LVDT sensor. The converted capacitive displacement sensor output is then coupled to the remainder of the LVDT measurement system, thereby allowing the user to efficiently modify the measurement system without having to replace the entire system.

BRIEF DESCRIPTION OF THE DRAWINGS

The invention will be more fully understood from the following detailed description taken in conjunction with the accompanying drawings in which.

DETAILED DESCRIPTION

Figure 1:
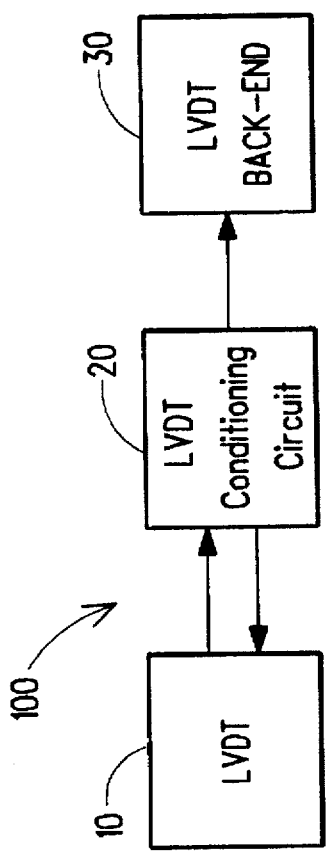
FIG. 1 is a block diagram of a prior art LVDT measurement system.

FIG. 1 is a block diagram of a prior art LVDT measurement system 100. The LVDT measurement system 100 comprises an LVDT 10 (described in greater detail below) electrically communicating with an LVDT conditioning circuit 20. The LVDT conditioning circuit 20 drives the LVDT and also transforms the output or outputs of the LVDT 10 to voltages or to digital representation. The LVDT conditioning circuit 20 is in electrical communication with an LVDT back-end 30, which can be a logic controller with feedback, a process control or monitoring system, a part selection and classification system, a quality selection system, a computer which provides display and storage of the measurements, or a system which provides an output in human readable form.

Figure 2:
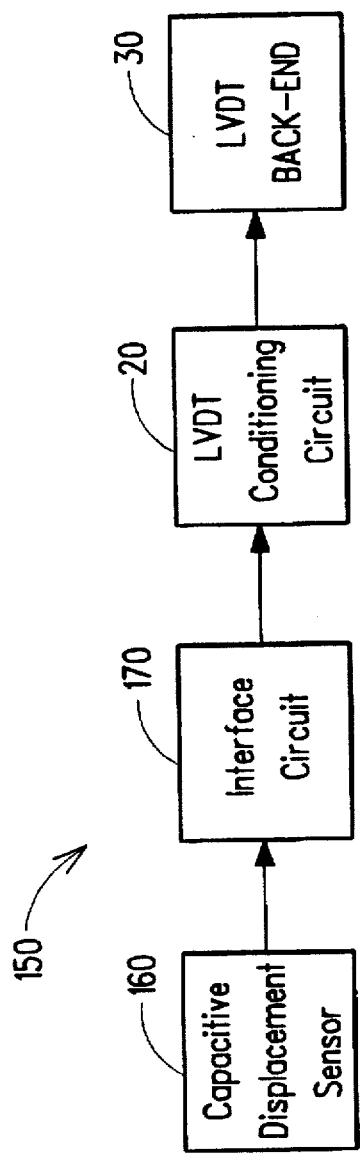
FIG. 2 is a block diagram of a measurement system having a capacitive displacement sensor and interface circuit front-end.

FIG. 2 is a block diagram of the present invention. In this embodiment a capacitive displacement sensor 160 (described below in greater detail) provides an output signal to a capacitive displacement sensor interface circuit 170. The capacitive displacement interface circuit 70 transforms the output of the capacitive displacement sensor into an output approximating that which would have been provided by an LVDT. The capacitive displacement interface circuit 170 provides this output to an LVDT conditioning circuit 20 which is coupled to an LVDT back-end 30 as in FIG. 1.

Figure 3:
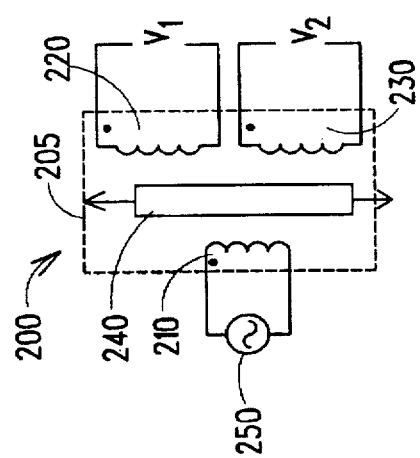
FIG. 3 is a circuit schematic of a prior art first type of LVDT configuration.

FIG. 3 depicts a first implementation of an LVDT 200 comprising a transformer 205 having a single primary 210 and two secondaries 220 and 230. A movable center slug 240 is disposed between the primary 210 and the secondaries 220 and 230. A sinusoidal excitation signal source 250 is applied to the primary 210 of the transformer 205. When center slug 240 is equidistant between the two secondaries 220 and 230 of the transformer 205, the outputs ($V_1$ and $V_2$) of the secondaries 220 and 230 are equal to each other. As center slug 240 moves towards secondary 220, the output $V_1$ of secondary 220 increases, while the output $V_2$ of secondary 230 decreases. The outputs of the secondaries 220 and 230 are linear functions of the position of the center slug 240 which is coupled to the LVDT's measurement arm (not shown). The output signals are in phase with the excitation signal provided by excitation signal source 250. The outputs of the secondaries can be expressed mathematically by the following formulas:

$$V_1 = k_1(p-p_m) a \sin(\omega t) + V_m a \sin(\omega t)$$

$$V_2 = k_1(p_m-p) a \sin(\omega t) + V_m a \sin(\omega t)$$

where:

$V_1$=first voltage output of the LVDT, $V_2$=second voltage output of the LVDT, $a\sin(\omega t)$=the sinusoidal excitation signal, $k_1$ =a gain constant of LVDT, $p_m$=position of the measurement arm at midpoint of its measurement range, and p=current measurement arm position.

Figure 4:
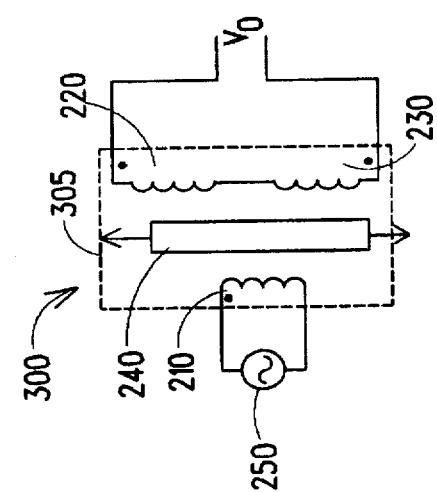
FIG. 4 is a circuit schematic of a prior art second type of LVDT configuration.

FIG. 4 shows a prior art LVDT 300 comprising a transformer 305 having its two secondaries 220 and 230 connected in series and out of phase in order to provide a single output signal $V_O$. As center slug 240 is deflected from its center position, the output $V_O$ will increase. The output signal will be in phase with the excitation signal provided by excitation signal source 250 if deflected to one side, and out of phase with the excitation signal if deflected to the other side. This output signal is mathematically described by the formula:

$$V_O = 2k_1 (p-p_m) a \sin(\omega t)$$

where:

$V_O$=Voltage output of the LVDT, $k_1$=gain constant of the LVDT, $p_m$=position of the measurement arm at midpoint of its measurement range, p=current measurement arm position, and $a\sin(\omega t)$=sinusoidal excitation signal.

Figure 5:
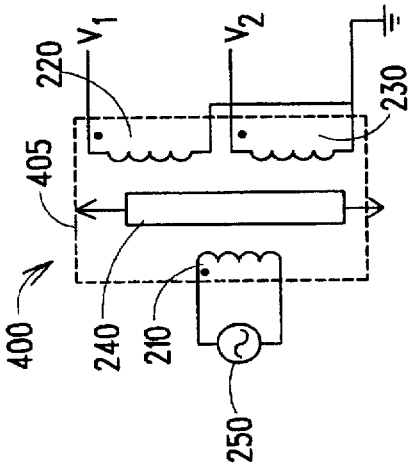
FIG. 5 is a circuit schematic of a prior art third type of LVDT configuration.

FIG. 5 is a circuit schematic of an LVDT 400 including a transformer 405. Transformer 405 has secondaries 220 and 230 having one end connected to ground. Such a configuration results in LVDT 400 providing ground referenced differential output signals $V_1$ and $V_2$ which are mathematically represented by the following two equations:

$$V_1 = k_1 (p-p_m) a\sin(\omega t) + V_m a\sin(\omega t)$$

$$V_2 = k_1 (p_m-p) a\sin(\omega t) + V_m a\sin(\omega t)$$

where:

$V_1$=first voltage output of the LVDT, $V_2$ =second voltage output of the LVDT, $k_1$=gain constant of the LVDT, $a\sin(\omega t)$=the sinusoidal excitation signal, $p_m$ =position of the measurement arm at midpoint of its measurement range, and p=current measurement arm position, and $V_m$=voltage with center slug at the center position.

Figure 6:
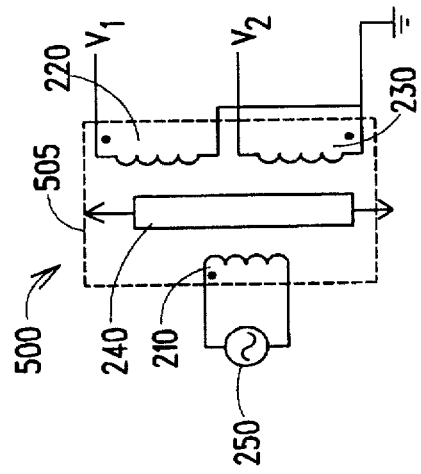
FIG. 6 is a circuit schematic of a prior art fourth type of LVDT configuration.

FIG. 6 is a circuit schematic of an LVDT 500 which is configured similar to the implementation of FIG. 5, except that secondary 230 of transformer 505 is connected in the opposite polarity as that of FIG. 5. The output signals for this implementation are mathematically described by the formulas:

$$V_1 = k_1 (p-p_m) a\sin(\omega t) + V_m a\sin(\omega t)$$

$$V_2 = k_1 (p-p_m) a\sin(\omega t) - V_m a\sin(\omega t)$$

where:

$V_1$=first voltage output of the LVDT, $V_2$=second voltage output of the LVDT, $k_1$=gain constant of the LVDT, $a\sin(\omega t)$=the sinusoidal excitation signal, $p_m$=position of the measurement arm at midpoint of its measurement range, and p=current measurement arm position, and $V_m$=voltage with center slug at the center position.

Figure 7:
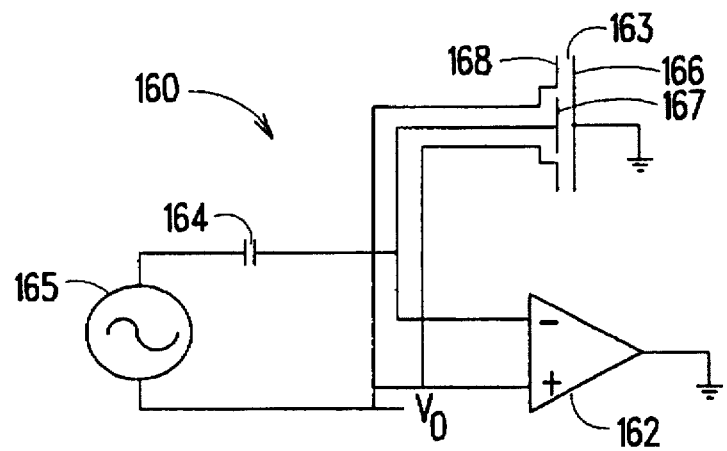
FIG. 7 is a circuit schematic of a prior art capacitive displacement sensor.

FIG. 7 is a circuit schematic of a capacitive displacement sensor 160. The capacitive displacement sensor includes an excitation signal source 165 which typically provides a sinusoidal excitation signal $V_1$ which is coupled through reference capacitor 164 to the inverting input of operational amplifier 162 and plate 167 of probe capacitor 163. Probe capacitor 163 is a three plate capacitor, including a sensor plate 167, a guard plate 168 and a target plate 166. Plate 166 of probe capacitor 163 is the surface of the object being measured and is connected to ground, as is the output of operational amplifier 162. Operational amplifier 162 has its output grounded, as such the operational amplifier 162 is operating as an inverting amplifier, with the sensor output $V_O$ being taken at the noninverting output of operational amplifier 162.

Plate 168 is connected to the noninverting input of operational amplifier 162, constitutes a guard, and also provides the output signal $V_O$. Capacitive displacement sensor 160 in conjunction with the aforementioned circuitry provides a sinusoidal output signal which is in phase with the excitation signal. The amplitude of the output signal is a linear function of the distance between plate 166 and the two plates 167 and 168 of the capacitive probe. Such a device is described in U.S. Pat. No. 4,918,376 to Poduje et al. The output of the capacitive displacement sensor is mathematically described as follows:

$$V_0 = V_i \frac{C_r d}{\epsilon_0 A}$$

where:

$V_0$=output voltage of the sensor, $V_i$=the excitation voltage, $C_r$=value of the reference capacitor, d=probe-to-surface spacing, $\epsilon_0$=permittivity of air, and A=area of the probe. As the probe-to-surface distance d changes, there is a concomitant linear change in the amplitude of output voltage $V_0$.

Applying a sinusoidal input voltage of asin($\omega$t), and given that $$k_c = \frac{C_r}{\epsilon_0 A}$$

we arrive at the equation:

$$v_0 = k_c d a \sin(\omega t)$$

where:

$V_0$=voltage output of capacitive displacement sensor, $k_c$=capacitive sensor gain constant and d=distance from capacitive probe to the object being measured, and asin($\omega$t) =sinusoidal excitation signal.

A capacitive displacement sensor measures the proximity from the sensor to a reference surface of the object being measured. The relation between the measurement voltage and object distance is employed, such that changes in the measured voltage bear a simple mathematical relationship to the distance between the capacitive probe plates 167, 168 and the reference surface of the object plate 166.

The output signal of the capacitive sensor can be converted to an equivalent form as the output signal of an LVDT by multiplying the capacitive sensor output by a scale factor and then subtracting a correctly scaled excitation signal as shown:

$$V_t = \frac{2k_1}{k_c} k_c d a \sin(\omega t) - 2k_1 b a \sin(\omega t)$$

which can be reduced to the equation:

$$V_t = 2k_1 (d-b) a \sin(\omega t)$$

where:

$V_t$=transformed output signal, b=a constant, $k_1$=gain constant of LVDT, $k_c$=capacitive sensor gain constant, d=distance from capacitive probe to the object being measured, and asin ($\omega$t)=sinusoidal excitation signal.

Figure 8:
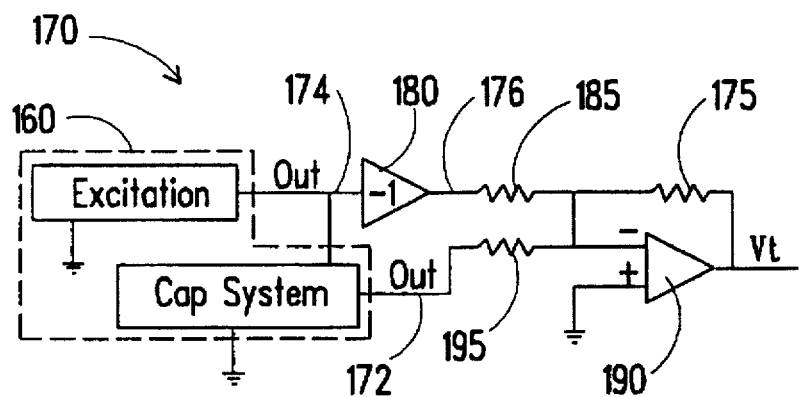
FIG. 8 is a circuit schematic of a first interface circuit.

The schematic diagram of FIG. 8 shows one of many possible hardware implementations of an interface circuit 170 for converting a capacitive displacement sensor output signal 172 to the form of the output signal of an LVDT configured to provide a single ended out-of-phase output (FIG. 4).

Operational amplifier 190 is configured as an inverting summing amplifier. The excitation signal 174 is inverted by inverter 180 and applied as one input to the inverting input of inverting summing amplifier 190 through resistor 185. The output 172 of the capacitive displacement sensor 160 is applied as another input to the inverting input of the inverting summing amplifier 190 through resistor 195. Feedback resistor 175 provides a feedback loop for the inverting summing amplifier 190. The circuit functions to subtract a scaled excitation signal by adding the inverted excitation signal 176 to the capacitive displacement sensor output signal 172 through inverting summing amplifier 190, thereby producing an output $V_1$ that is substantially equal to the output provided by the LVDT of FIG. 4. Accordingly, through interface circuit 170, the capacitive displacement sensor output signal 172:

$$V_o = k_c d a \sin(\omega t)$$

is transformed into the signal:

$$V_t = 2k_1 (d-b) a \sin(\omega t)$$

which is of the same form as LVDT output signal:

$$V_o = 2k_1 (p-p_m) a \sin(\omega t).$$

Figure 9:
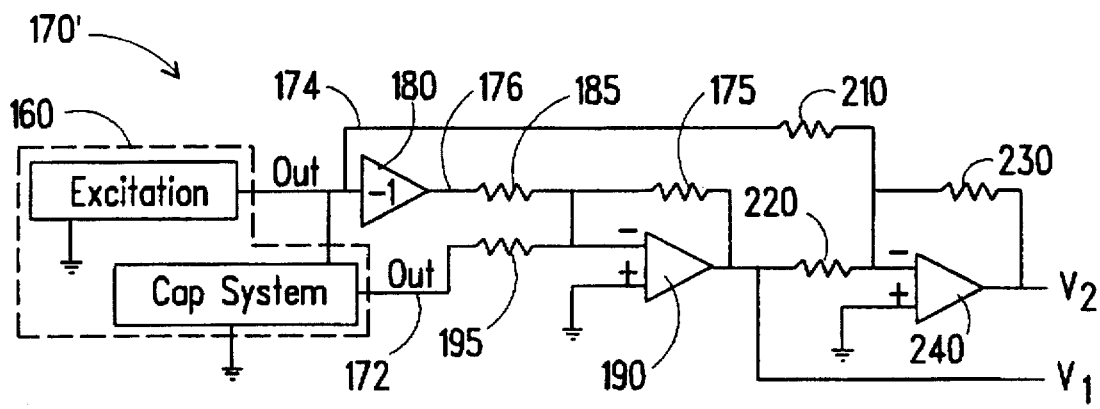
FIG. 9 is a circuit schematic of a second interface circuit.

The schematic diagram of FIG. 9 shows a hardware implementation 170' of one manner of converting the output 172 of a capacitive displacement sensor 160 to approximate that of an LVDT configured to provide a differential output. Operational amplifier 190 is configured as an inverting summing amplifier. Inverter 180 receives the excitation signal 174 used within capacitive displacement sensor 160 and provides an inverted version of the excitation signal 176 at its output. The output 176 of inverter 180 and the output 172 of the capacitive displacement sensor 160 are provided to the inverting input of inverting summing amplifier 190 through resistors 185 and 195 respectively. Resistor 175 is a feedback resistor. The output of inverting summing amplifier 190 provides first output $V_1$. A second operational amplifier 240 is also configured as an inverting summing amplifier having resistor 230 as its feedback resistor. The excitation signal 174, used within the capacitive displacement sensor 160, and the output $V_1$ from operational amplifier 190 are provided to the inverting input of operational amplifier 240 through resistors 210 and 220 respectively. The output of inverting summing amplifier 240 provides the second output $V_2$ of the interface circuit 170'. This interface circuit thereby provides for transformation of the capacitive displacement sensor output signal into dual differential output signals:

$$V_1 = k_t (d-b) a \sin(\omega t) \text{ and}$$

$$V_2 = k_t (b-d) a \sin(\omega t).$$

Figure 10:
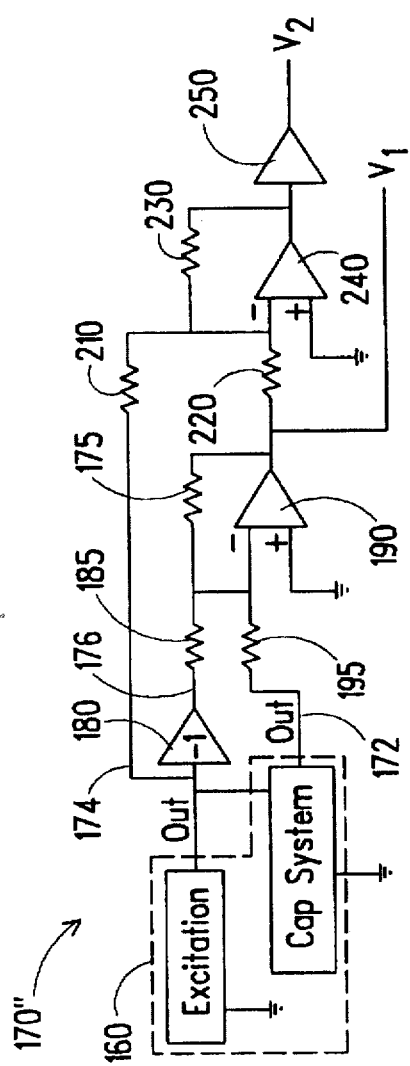
FIG. 10 is a circuit schematic of a third interface circuit.

FIG. 10 shows a schematic of a third type of interface circuit 170". The circuit of FIG. 10 is similar to the circuit of FIG. 9 described above, with the only difference being the addition of an inverter 250 to the output of second inverting summing amplifier 240 thereby providing differential outputs:

$$V_1 = k_t (d-b) a \sin(\omega t) \text{ and}$$

$$V_2 = k_t (b+d) a \sin(\omega t).$$

Figure 11:
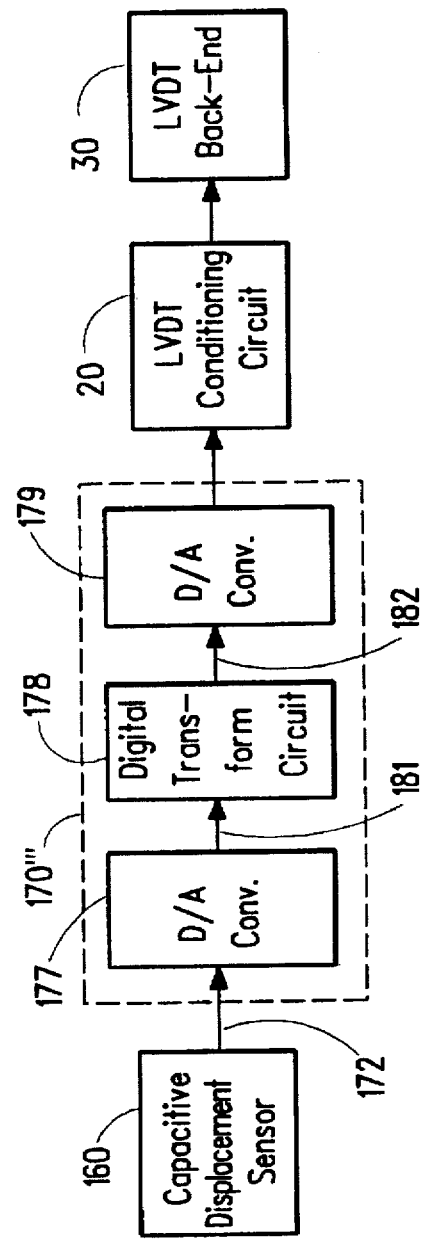
FIG. 11 is a block diagram of an interface circuit implementing D/A and A/D converters.

FIG. 11 shows another embodiment of an interface circuit 170'''. In this embodiment the output 172 of the capacitive display sensor 160 is coupled to an A/D converter 177. The A/D converter 177 receives an analog input signal 172 and provides a digital output signal 181 representative of the analog input signal 172. The output 181 of the A/D converter 177 is connected to a digital transformation circuit 178. The digital transformation circuit 178 modifies the digital output signal 181 provided by A/D converter 177. A modification includes, but is not limited to, addition, subtraction, multiplication, shifting and/or other functions as are known in the art. The transformed digital signal 182 is then supplied to a D/A converter 179. The D/A converter 179 converts the transformed digital signal 182 provided by the digital transformation circuit 178 into an analog signal which is representative of the transformed digital signal 182. The output of the D/A converter 179 is an analog signal which approximates the output of an LVDT.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

We claim:

1. A method of emulating an output signal of a linear variable differential transducer (LVDT) including the steps of:
   providing an output signal from a capacitive displacement sensor;
   modifying said output signal of said capacitive displacement sensor to provide an emulated LVDT signal; and
   providing said emulated LVDT signal to an LVDT conditioning circuit.

2. The method of claim 1 wherein the step of modifying said output signal of said capacitive gaging system comprises:
   producing an intermediate signal by multiplying said output signal of said capacitive gaging system by a scale factor; and
   subtracting a scaled excitation signal from said intermediate signal.

3. The method of claim 1 wherein the step of modifying said output signal of said capacitive gaging system comprises:
   producing a first digital signal by converting said output signal through an A/D converter;
   producing a second digital signal by modifying said first digital signal through a digital transformation circuit;
   converting said second digital signal into an analog signal by a D/A converter.

4. The method of claim 1 wherein said emulated LVDT signal comprises two sinusoidal phase-locked outputs.

5. The method of claim 1 wherein said emulated LVDT signal comprises a single ended out-of-phase output.

6. The method of claim 1 wherein said emulated LVDT signal comprises a ground reference differential output.

7. The method of claim 1 wherein said emulated LVDT signal comprises a dual differential output.

8. An apparatus for emulating an LVDT sensor output comprising:
   a capacitive displacement sensor; and
   an interface circuit, said interface circuit receiving an output signal from said capacitive displacement sensor, said interface circuit converting said output signal from said capacitive displacement sensor into an interface circuit output signal emulating an LVDT sensor output signal.

9. The apparatus of claim 8 wherein said interface circuit output signal comprises a single ended out of phase signal.

10. The apparatus of claim 8 wherein said interface circuit output signal comprises two sinusoidal phase-locked signals.

11. The apparatus of claim 8 wherein said interface circuit output signal comprises a ground reference differential output.

12. The apparatus of claim 8 wherein said interface circuit output signal comprises a dual differential output.

13. The apparatus of claim 8 wherein said interface circuit comprises:
   an inverter, said inverter receiving an excitation voltage from said capacitive displacement sensor, said inverter providing an inverted excitation signal; and
   an operational amplifier configured as an inverting summing amplifier, said operational amplifier receiving said inverted excitation signal through a first resistor at an inverting input, said operational amplifier receiving an output provided by said capacitive displacement sensor through a second resistor at said inverting input, said operational amplifier having its non-inverting input grounded, said operational amplifier having a feedback resistor between an output and said inverting input, said operational amplifier providing an output signal.

14. The apparatus of claim 8 wherein said interface circuit comprises:
   an inverter, said inverter receiving an excitation voltage from said capacitive displacement sensor, said inverter providing an inverted excitation signal;
   a first operational amplifier configured as an inverting summing amplifier, said first operational amplifier receiving said inverted excitation signal through a first resistor at an inverting input, said first operational amplifier receiving an output provided by said capacitive displacement sensor through a second resistor at said inverting input, said first operational amplifier having its non-inverting input grounded, said first operational amplifier having a first feedback resistor between an output and said inverting input, said first operational amplifier providing a first output signal; and
   a second operational amplifier configured as an inverting summing amplifier, said second operational amplifier receiving said excitation signal through a third resistor at an inverting input, said second operational amplifier receiving an output provided by said first operational amplifier through a fourth resistor at said inverting input, said second operational amplifier having its non-inverting input grounded, said second operational amplifier having a second feedback resistor between an output and said inverting input, said second operational amplifier providing a second output signal.

15. The apparatus of claim 8 wherein said interface circuit comprises:
   an inverter, said inverter receiving an excitation voltage from said capacitive displacement sensor, said inverter providing an inverted excitation signal;
   a first operational amplifier configured as an inverting summing amplifier, said first operational amplifier receiving said inverted excitation signal through a first resistor at an inverting input, said first operational amplifier receiving an output provided by said capacitive displacement sensor through a second resistor at said inverting input, said first operational amplifier having its non-inverting input grounded, said first operational amplifier having a first feedback resistor between an output and said inverting input, said first operational amplifier providing a first output signal;

a second operational amplifier configured as an inverting summing amplifier, said second operational amplifier receiving said excitation signal through a third resistor at an inverting input, said second operational amplifier receiving an output provided by said first operational amplifier through a fourth resistor at said inverting input, said second operational amplifier having its non-inverting input grounded, said second operational amplifier having a second feedback resistor between an output and said inverting input, said second operational amplifier providing an intermediate signal; and a second inverter, said second inverter receiving said intermediate signal at an input, said second inverter providing a second output signal.

16. The apparatus of claim 8 wherein said interface circuit comprises:

an A/D converter, said A/D converter receiving said capacitive displacement output and providing a first digital signal;

a digital transformation circuit, said digital transformation circuit modifying said first digital signal, said digital transformation circuit providing a second digital signal; and a D/A converter, said D/A converter receiving said second digital signal, said D/A converter providing an analog output signal.

17. A measurement system comprising:

a capacitive displacement sensor;

an interface circuit, said interface circuit communicating with said capacitive displacement sensor and providing an interface circuit output signal emulating an LVDT sensor output signal;

an LVDT conditioning circuit, said LVDT conditioning circuit in communication with said interface circuit output signal emulating an LVDT sensor output signal; and an LVDT back-end, said LVDT back-end in communication with said LVDT conditioning circuit.

18. The system of claim 17 wherein said LVDT back-end comprises a logic controller.

19. The system of claim 17 wherein said LVDT back-end comprises a process control system.

20. The system of claim 17 wherein said LVDT back-end comprises a part selection and classification system.

21. The system of claim 17 wherein said LVDT back-end comprises a quality selection system.

22. The system of claim 17 wherein said LVDT back-end comprises a computer.

23. The system of claim 17 wherein said LVDT back-end comprises a system providing an output in human readable form.

* * * * *

UNITED STATES PATENT AND TRADEMARK OFFICE
CERTIFICATE OF CORRECTION

PATENT NO. : 5,708,368
DATED : January 13, 1998
INVENTOR(S) : Roy Mallory

It is certified that error appears in the above-identified patent and that said Letters Patent is hereby corrected as shown below:

Column 6, Line 65 equation "$V_2 = k_j(b+d)\,a\sin(\omega t)$"

should read -- $V_2 = k_1(b+d)\,a\sin(\omega t)$ --

Signed and Sealed this

Twenty-fourth Day of August, 1999

Attest:

Q. TODD DICKINSON

*Attesting Officer*  *Acting Commissioner of Patents and Trademarks*